United States Patent [19]
De Baun et al.

[11] 3,842,678
[45] Oct. 22, 1974

[54] ISOKINETIC SAMPLING SYSTEM

[75] Inventors: Kenneth W. De Baun; Robert W. Noll, both of Santa Rosa, Calif.

[73] Assignee: Air Monitor Corporation, Santa Rosa, Calif.

[22] Filed: June 1, 1973

[21] Appl. No.: 365,847

[52] U.S. Cl. .......................................... 73/421.5 A
[51] Int. Cl. .......................................... G01n 1/22
[58] Field of Search .... 73/421.5 R, 421.5 A, 422 R, 73/422 TC

[56] References Cited
UNITED STATES PATENTS

| | | | |
|---|---|---|---|
| 2,452,224 | 10/1948 | Collett | 73/421.5 |
| 2,685,355 | 8/1972 | De Baum | 73/212 |
| 2,780,567 | 12/1973 | Ovard | 73/421.5 |

FOREIGN PATENTS OR APPLICATIONS

| | | | |
|---|---|---|---|
| 64,596 | 5/1968 | Germany | 73/421.5 |

*Primary Examiner*—S. Clement Swisher
*Attorney, Agent, or Firm*—James F. Mitchell

[57] ABSTRACT

An isokinetic sampling system for measuring the amount of contaminant flowing through a conduit such as a stack which includes an equalizer means in the stack for equalizing flow velocities over the cross-section of the stack, a measuring station downstream of the equalizing means for measuring the flow velocity and flow rate of fluid through the stack, sampling means in the stack near the measuring station for collecting a portion of the fluid flowing through the stack, sensing means for sensing the velocity of the sample being collected and control means for equalizing the sample flow velocity and the fluid flow velocity. Further components may be added to the system to refine the sampling and measuring of the contaminant.

15 Claims, 7 Drawing Figures

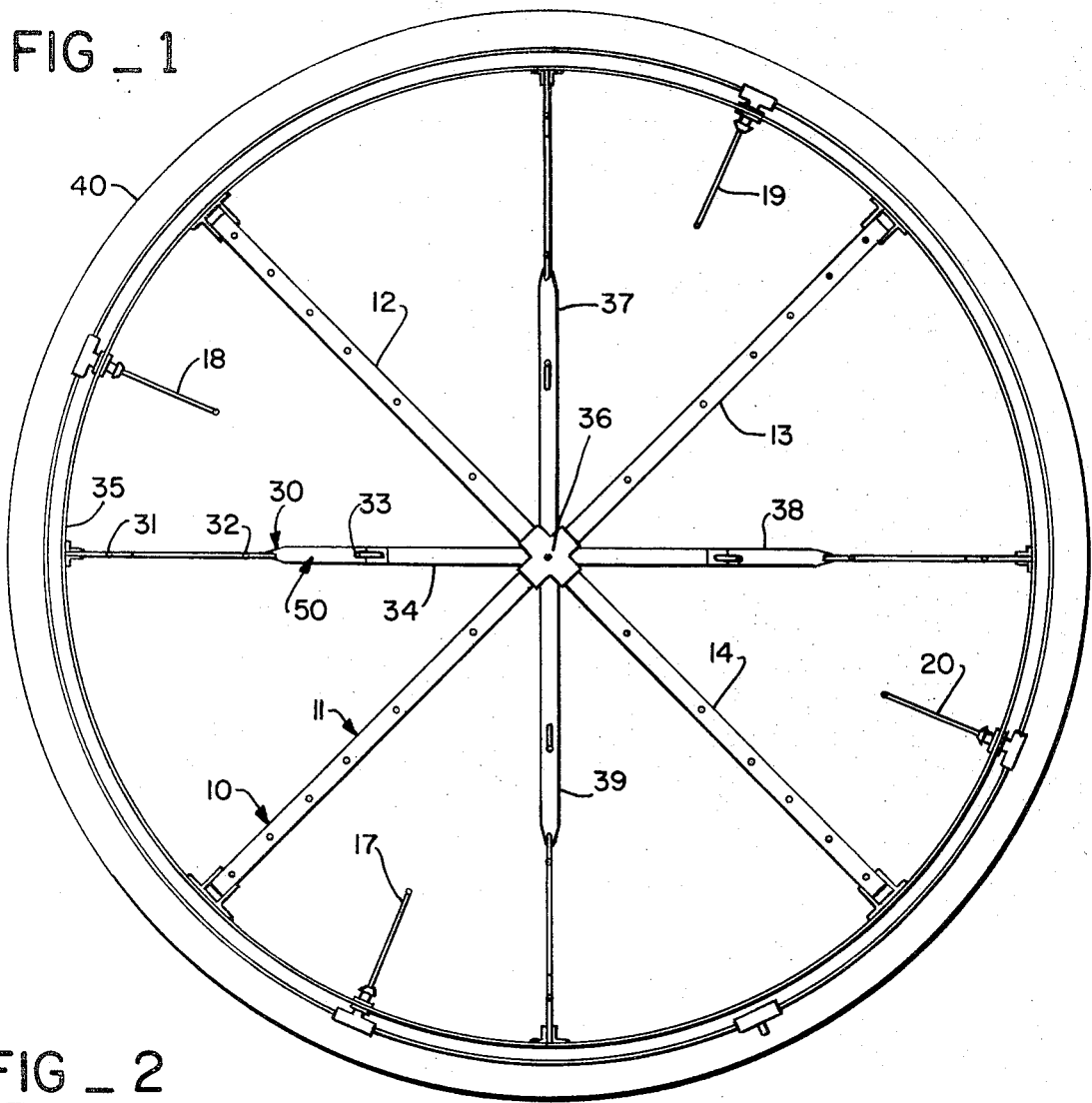
FIG_1
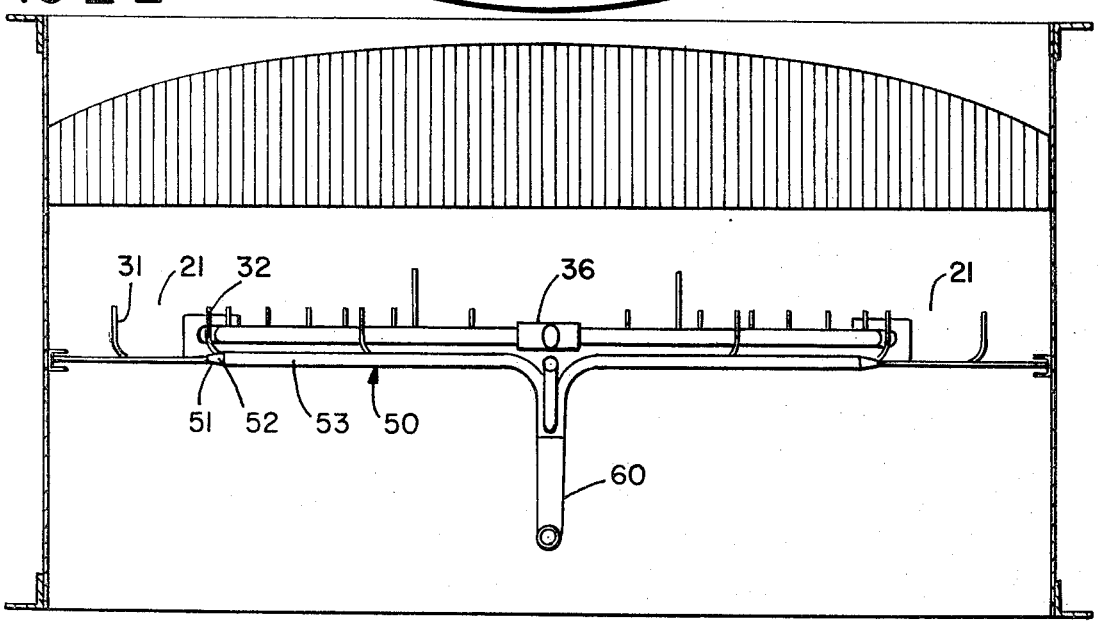
FIG_2

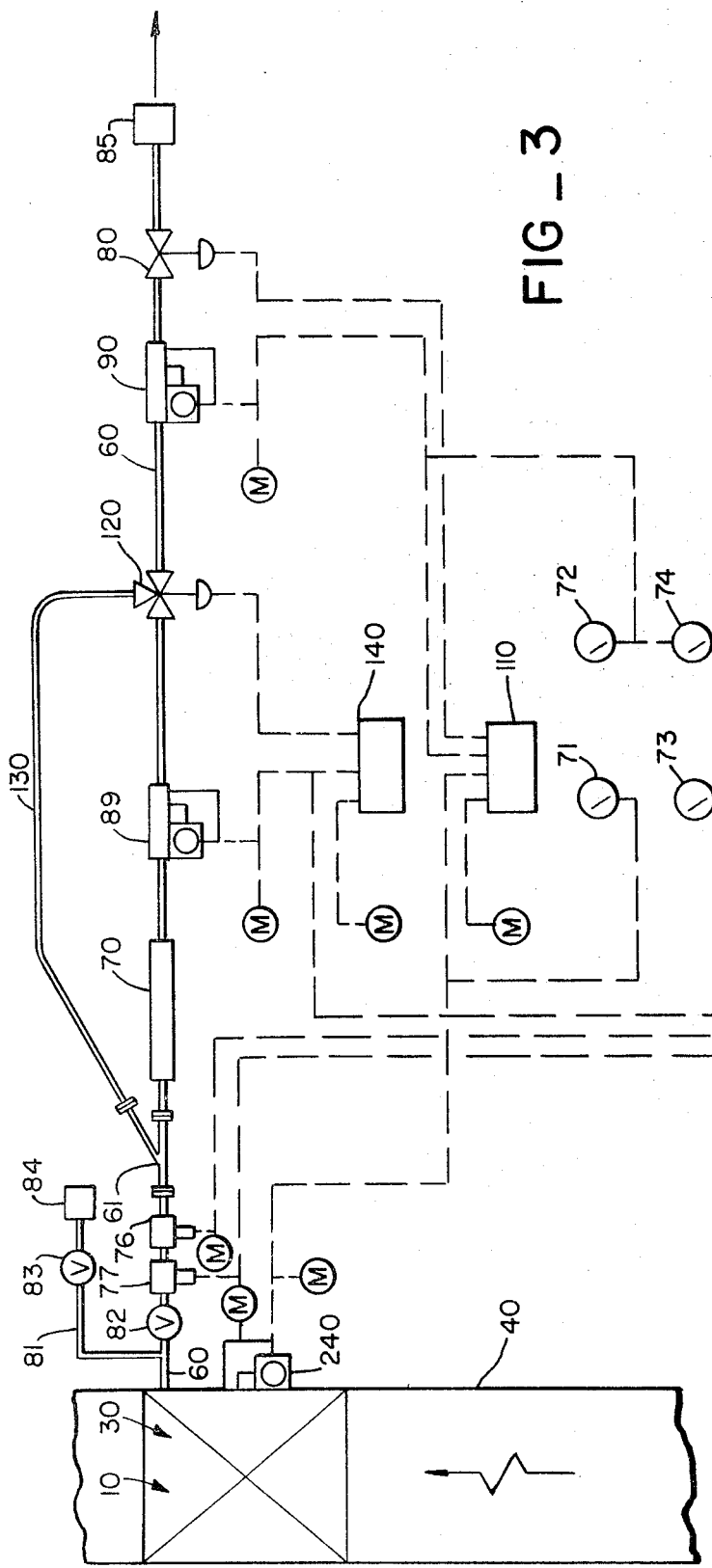

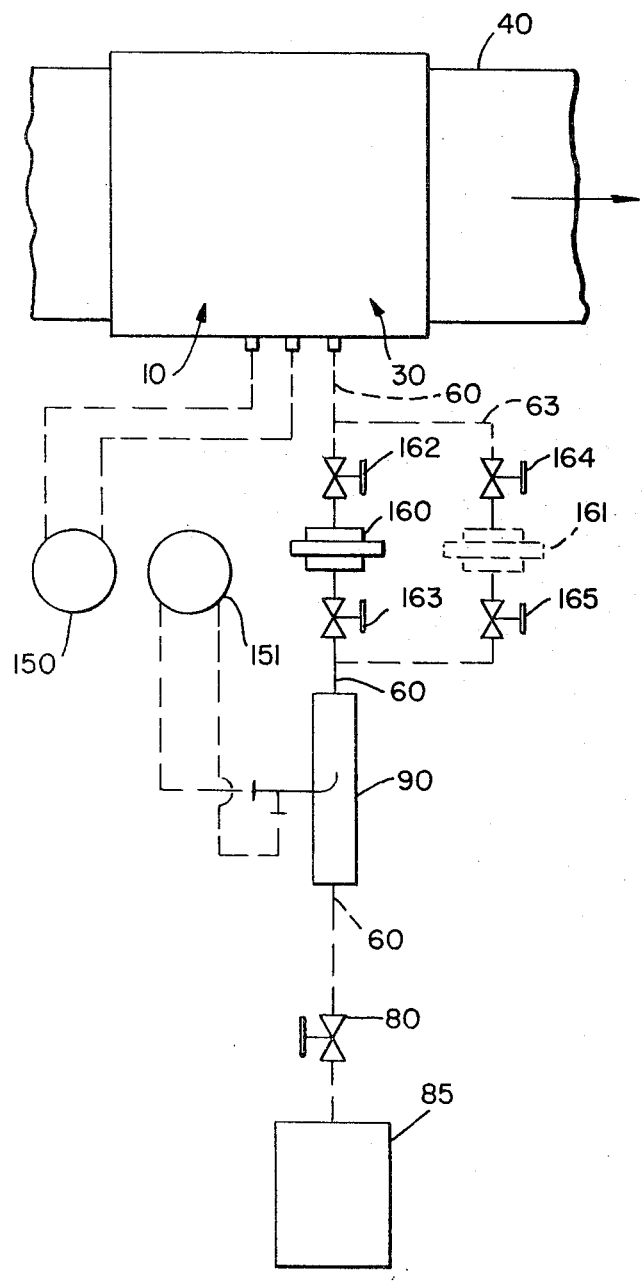
FIG _ 5
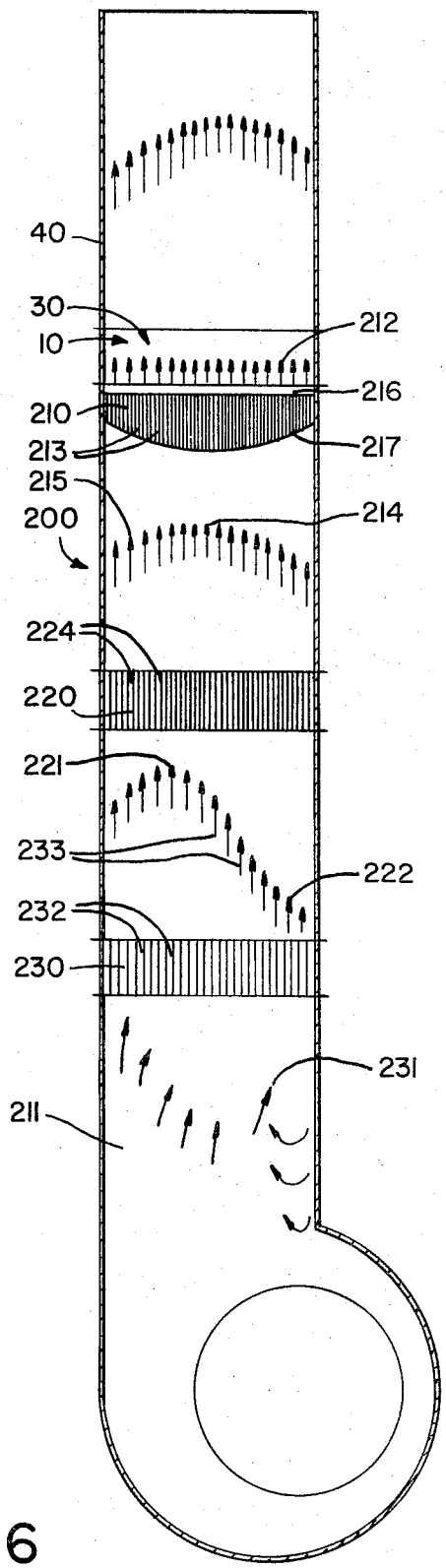
FIG _ 6

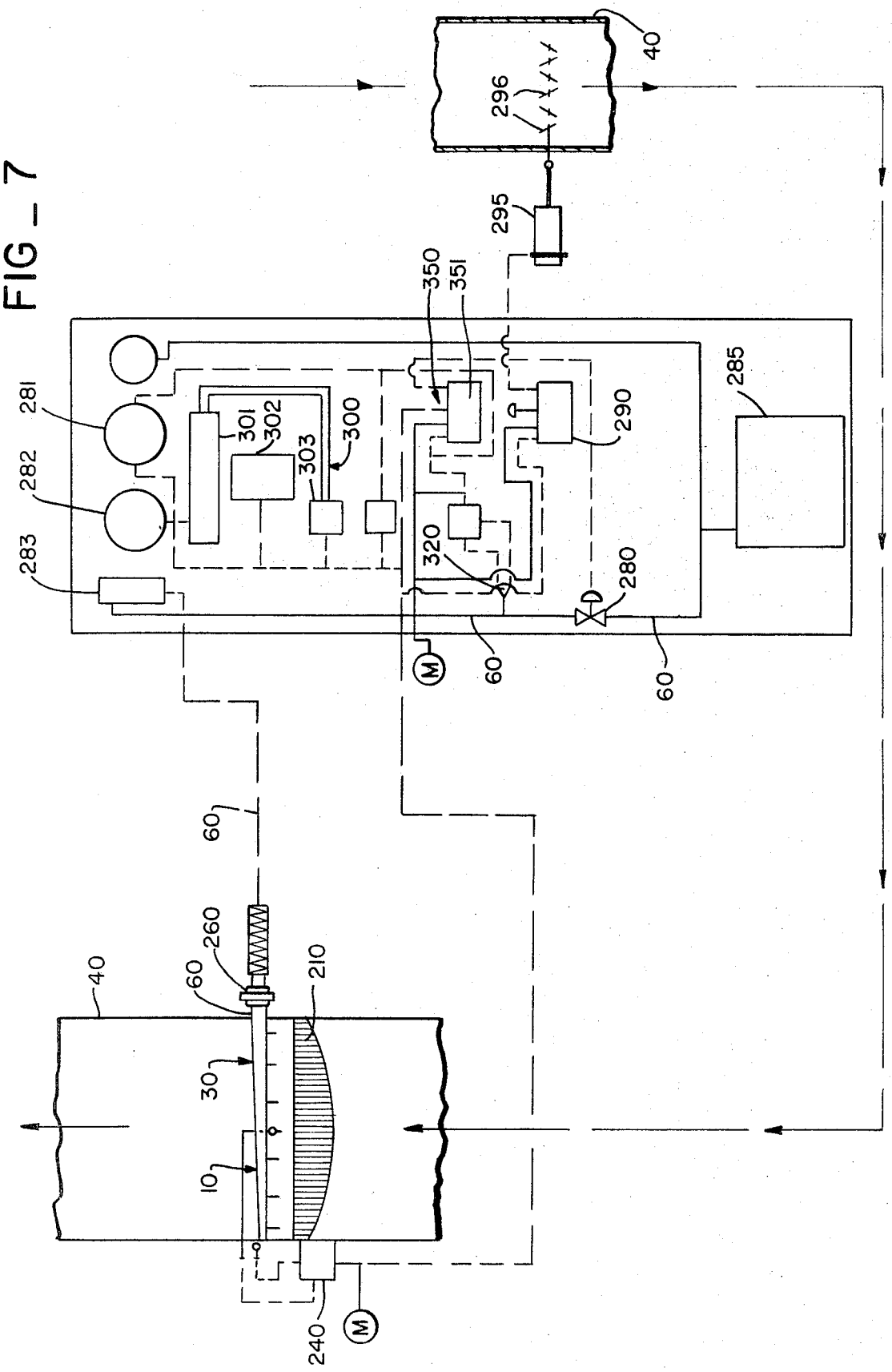

ISOKINETIC SAMPLING SYSTEM

This invention relates generally to the field of pollution control and more specifically to the identification and quantification of pollutants exhausted through stacks or other conduits.

More particularly, this invention is directed to an isokinetic sampler, i.e., a sampler through which the sample is drawn from a fluid at the same flow velocity of the fluid flowing through a stack. The importance of removing a sample isokinetically is to insure a reliable measurement of the quantity and quality of the contaminant flowing through the stack.

The invention is also directed toward a sampling system which provides extremely accurate measurements of fluid flow rate through the stack or other conduit as well as an extremely accurate measurement of flow velocity of the sample being removed.

Examples of isokinetic samplers known in the prior art include U.S. Pat. No. 2,982,131 dated May 2, 1961 to J. Rosinski for "Automatic Isokinetic Sampling Device;" U.S. Pat. No. 3,261,199 dated July 19, 1966 to G. S. Raynor for "Isokinetic Sampling Apparatus;" U.S. Pat. No. 3,473,388 dated Oct. 21, 1969 to L. G. Lynn for "Isokinetic Particle Sampler;" and U.S. Pat. No. 3,707,869 dated Jan. 2, 1973 to G. S. Raynor for "Airbourne Isokinetic Sampler." These samplers provide only crude sampling techniques since, among other things, they use single sampling tips and do not treat the fluid before sampling it.

U.S. Pat. No. 3,685,355 dated Aug. 22, 1972 to Kenneth W. DeBaun for "Air Monitoring System" discloses an air monitoring system, portions of which are used in the instant invention. The instant invention utilizes additional components not present in the air monitoring system. The instant invention also utilizes apparatus different from that in the air monitoring system for treating the fluid prior to sampling it.

A principal object of this invention is to provide an isokinetic sampling system which provides an extremely reliable sample of a fluid with contaminants flowing through a stack or other conduit.

A further object of this invention is to provide an isokinetic sampling system which can be operated automatically.

A further object of this invention is to provide an isokinetic sampling system with an output which may be recorded, totalized, supplied to a computer system or simply observed.

A further object of this invention is to provide an isokinetic sampler which incorporates fluid flow velocity equalizer means for producing a uniform velocity profile over the cross-section of the stack or other conduit and then taking a plurality of samples from different points of the crosssection of the conduit.

A further object of this invention is to provide an isokinetic sampling system in which the sample is taken from the same point in a conduit at which the flow rate in the conduit is sensed.

A further object of the invention is to provide an isokinetic sampling system which is readily adapted to provide either particulate sampling or continuous flow analysis.

A further object of this invention is to provide an isokinetic sampler in which the fluid flow rate through the stack or conduit is maintained at a constant level.

Further objects and advantages will become apparent from the following description of preferred embodiments and the drawings wherein:

FIG. 1 is a top elevational view of a portion of the system mounted in the stack or conduit;

FIG. 2 is a side elevational view of the apparatus of FIG. 1;

FIG. 3 is a schematic representation of the invention;

FIG. 4 is a side elevational view, in section, of a portion of the invention;

FIG. 5 is a schematic representation of an alternate embodiment of the invention;

FIG. 6 is a schematic representation of flow velocity equalizer means used in the invention; and FIG. 7 is a schematic representation of another embodiment of the invention.

Referring to FIGS. 1 and 2, a fluid flow measuring station 10 is shown which includes a plurality of total pressure sensors 11, 12, 13 and 14 and a plurality of static pressure sensors 17, 18, 19 and 20, the tips of which are aligned in a sensing plane 21 as shown in FIG. 2. Measuring station 10 is shown in U.S. Pat. No. 3,685,355 dated Aug. 22, 1972, referred to above.

FIGS. 1 and 2 also show isokinetic sampling means 30 which includes a plurality of inlets 31, 32 and 33 distributed along arm 34 extending from wall 35 of stack or conduit 40 into the center 36 of conduit 40. Sampling means 30 also includes arms 37, 38 and 39 which are identical to arm 34. The plurality of inlets on arms 34, 37, 38 and 39 are connected together by manifold means 50. The tips of these inlets lie in sensing plane 21. Sampling means 30 must be near sensing plane 21 so that the relative velocities of the fluid and sample can be accurately compared. The cross-sectional area of manifold means 50 increases from inlet 31 to the center 36 of conduit 40 to facilitate isokinetic flow of the sample through manifold means 50. Manifold means 50 includes arms 34, 37, 38 and 39. The cross-sectional area of manifold means 50 is enlarged at point 51 by a conical section 52 of manifold means 50. By enlarging the cross-sectional area of manifold means 50 at point 51, the sample flowing into inlet 32 flows into portion 53 of manifold means 50 at the same velocity as that of the sample flowing into inlet 31.

Inlets 31, 32 and 33 are distributed along arm 34 in such fashion that each inlet represents approximately the same cross-sectional area of conduit 40. Manifold means 50 communicates the inlets together at a point near the center 36 of conduit 40 and collects the sample into an outlet line 60 shown in FIG. 2.

FIG. 3 is a schematic representation of one embodiment of this invention. Fluid flows through stack or conduit 40 through the monitoring station 10 and sampler 30. Outlet line 60 carries the isokinetic sample away from conduit 40. An analyzer 70 is placed in outlet line 60 for identifying and measuring the quantity of the contaminant contained in the sample. A control valve 80 is mounted in outlet line 60 downstream of analyzer 70 and downstream of sample sensing means 90. A vacuum pump 85 in outlet line 60 downstream of valve 80 provides the driving force for removing the sample from conduit 40.

Comparator 110 compares the velocity of the sample flowing through sample sensing means 90 with the velocity of fluid flowing past monitoring station 10. Control valve 80 operates in response to comparator 110 to either increase or decrease the velocity of the sample flowing through outlet line 60 so that the velocity of the sample at the sampling inlets 31, 32 and 33 is equal to that of the fluid flowing through conduit 40. Transmitter 240 receives the output from measuring station 10 indicating the velocity of fluid flowing through conduit 40 and transmits this velocity information to comparator 110. Sample sensing means 90 transmits sample flow velocity to comparator 110. Comparator 110 is a conventional fluid controlling receiver, in which a fluid jet of the sample from sensing means 90 is conducted along line 111 and directly opposes and impinges against a jet of fluid flowing through conduit 40 and carried through line 112 to comparator 110. Since the fluid jets impinge against each other, the resulting jet, or radial jet, will be positioned midway between the output nozzles of the opposed jets when the opposed jets are equal in velocity. As the velocity of one jet increases, the position of the resultant or radial jet will move away from the nozzle of the stronger jet toward the nozzle of the weaker jet. Comparator 110 senses the movement of the resultant or radial jet and operates control valve 80 to equalize the velocities of the opposed jets. A comparator of this type which may be used in the invention is the Johnson Service Company T—9000 Controlling Receiver as described in 96 JC12 Johnson Control Reference Bulletin No. 1—T—9000.

A second sample sensing means 89 is mounted in outlet line 60 immediately downstream of analyzer 70 for measuring the volume of the sample passing through analyzer 70. Since many conventional analyzers require a constant flow rate to operate effectively, a bypass line 130 and bypass control means are provided in this invention for regulating the flow of said sample to assure a constant flow rate of sample through analyzer 70. Bypass control means includes bypass control valve 120 which is mounted in outlet line 60 and which also receives the output of bypass line 130. A bypass regulator 140 monitors the second sample sensing means 89 and operates bypass control valve 120 by either reducing or enlarging the amount of sample which flows through bypass line 130. Bypass line 130 is connected to outlet line 60 at a point 61 upstream of analyzer 70. Bypass line 130 bypasses analyzer 70 and second sample sensing means 89 and intersects outlet line 60 at bypass control valve 120.

In FIG. 3, a comparator 110 and valve 80 constitute control means responsive to the fluid flow velocity sensed by measuring station 10 and to the sample flow velocity sensed by sample sensing means 90 for regulating the sample flow velocity relative to the fluid flow velocity in conduit 40.

FIG. 4 shows in greater detail the sample sensing means 90 shown in FIG. 3. Sample sensing means 90 has a cylindrical chamber 91 of known cross-sectional area. A fourth honeycomb section 92 completely fills the cross-sectional area of cylindrical chamber 91 and has a plurality of axially extending passageways 96 for creating laminar flow on the downstream side of honeycomb section 92. The sample flowing in outlet line 60 enters chamber 91, flows through honeycomb section 92 and flows across sensing tip 93. Sensing tip 93 has a plurality of inlets 94 for measuring static pressure and an inlet 95 for measuring total pressure. The sample flow velocity through sample sensing means 90 is deduced from the static and total pressures sensed by sensing tip 93. Although the cross-sectional area of chamber 91 may be designed such that the sample velocity at sensing tip 93 equals the velocity of the sample entering inlets 31, 32 and 33 (See FIGS. 1 and 2), it is not necessary to so design chamber 91. Any difference in flow velocities at inlets 31, 32 and 33 as compared to sample velocity at tip 93 may be compensated for by adjusting the gain of comparator 110.

The system shown in FIG. 3 can be readily adaptable for providing output readings into computer systems. Meter 71 is connected to transmitter 240 and indicates fluid velocity in the stack or conduit 40. Meter 72 is connected to sample sensing means 90 and indicates sample flow velocity at sampling inlets 31, 32 and 33. Meter 73 is connected to second sample sensing means 89 and indicates the rate at which the sample flows through analyzer 70. Meter 74 is connected to humidity transmitter 76 positioned in outlet line 60 near conduit 40 and indicates stack humidity. Stack humidity may be used to refine the measurements of fluid velocity and flow rate. Meter 75 is connected to temperature transmitter 77 and indicates stack temperature, which also may be used to make minor corrections for fluid velocity and flow rate. A purge line 81 intersects outlet line 60 near conduit 40. When it is desirable to clean sampling means 30, first purge valve 82 in outlet line 60 is closed, second purge valve 83 in purge line 81 is opened, and a blast of compressed air from air source 84 is forced back through sampling means 30 to blow out contaminants collected therein.

FIG. 5 shows an alternate embodiment of the invention designed for manual operation. Meter 150 responds to the output of measuring station 10 (shown in block form) and displays the flow velocity of fluid flowing through conduit 40. Outlet line 60 constitutes outlet means for carrying the sample from conduit 40. Filter means 160 is positioned in outlet line 60 and removes the contaminant from the sample flowing through outlet line 60. In order to facilitate the periodic removal of contaminant trapped by filter 160, an alternate filter 161 may be provided in branch line 63 of outlet line 60. Valves 162, 163, 164 and 165 are used when alternate filter 161 is utilized. When the sample flows through filter means 160, valves 162 and 163 are opened and valves 164 and 165 in branch line 63 are closed. When it becomes desirable to remove and clean filter means 160, valves 164 and 165 are opened, valves 162 and 163 are closed, and filter means 160 is then removed and cleaned. Sample sensing means 90 is located in outlet line 60 downstream of filter means 160 and measures the flow velocity of the sample. The sample flow velocity at sample inlets 31, 32 and 33 (FIG. 2) is displayed at meter 151. The operator equalizes the sample flow velocity at the sampling inlets 31, 32 and 33 with the fluid flow velocity through conduit 40 by adjusting valve 80 for varying the flow velocity of the sample through outlet line 60. Vacuum pump 85 mounted in outlet line 60 downstream of sample sensing means 90 pumps the sample out of conduit 40 and through outlet line 60. The sample may be pumped back into conduit 40 from pump 85 if desired.

FIG. 6 is a schematic representation showing how the instant invention processes the fluid flowing in conduit 40 upstream of the point at which the isokinetic sampling means 30 is located. The air measuring station 10 and sampling means 30 are shown schematically in block form.

Fluid flow velocity equalizer means is shown generally as 200 in FIG. 6. In the embodiment shown in FIG. 6, the equalizer means 200 comprises a first honeycomb section 210, a second honeycomb section 220 upstream of first honeycomb section 210 and a third honeycomb section 230 upstream of the second honeycomb section 220. The function of honeycomb sections 210, 220 and 230 is to convert the generally turbulent flow at point 211 to a laminar flow with a uniform fluid flow velocity over the cross-sectional area of conduit 40 as shown at point 212 which lies in the sensing plane 21 of the monitor station 10.

The first honeycomb section 210 has a plurality of parallel, axially extending passages 213, the lengths of which vary over the cross-sectional area of conduit 40 to equalize the fluid flow velocities across the cross-sectional area of conduit 40. The passageways 213 near the center of conduit 40 are longer than those passageways near the walls of conduit 40 so that the faster flowing fluid 214 near the center of conduit 40 is slowed to a greater extent than the slower flowing fluid 215 near the walls of conduit 40, resulting in a uniform velocity of the fluid at point 212. The downstream end of 216 of honeycomb section 210 lies in a vertical plane perpendicular to the axis of conduit 40 and parallel to sensing plane 21, so that honeycomb section 210 may be mounted as close as possible to the fluid flow measuring station 10. The upstream end 217 of honeycomb section 210 forms a generally arcuate surface, the parameters of which depend upon the velocity of the fluid flow, the configuration of conduit 40 and the size of the conduit.

A second honeycomb section 220 is positioned in conduit 40 upstream of first honeycomb section 210. Honeycomb section 220 completely fills the cross-sectional area of conduit 40 with a plurality of parallel, axially extending passageways 224, each passageway having a larger cross-sectional area than the passageways of honeycomb section 210. Honeycomb section 220 surpresses the high velocity fluid flow shown by reference numeral 221 relative to the low velocity fluid flow shown by reference numeral 222 to provide a more uniform velocity distribution as shown by reference numerals 214 and 215. Honeycomb section 220 is optional, i.e., honeycomb section 210 may constitute the only fluid flow treatment apparatus upstream of the fluid flow measuring station 10 and the sampler 30.

A third honeycomb section 230 is positioned in conduit 40 upstream of honeycomb section 220. Honeycomb section 230 has a plurality of parallel, axially extending passages 232 with cross-sectional areas greater than the passageways 224 of honeycomb section 220. The primary function of honeycomb section 230 is to convert turbulent flow as shown by reference numeral 231 to laminar flow shown by arrows 233. Honeycomb section 230 is also optional, i.e., honeycomb sections 210 and 220 may be used in combination wtih station 10 and sampler 30 without honeycomb section 230.

The use of optional honeycomb sections 220 and 230 depends upon the size of the duct and the turbulence of the fluid flow in conduit 40. When only honeycomb section 210 is used, it constitutes a fluid flow velocity equalizer means. When honeycomb section 220 is also used, fluid flow velocity equalizer means comprises honeycomb sections 210 and 220 and when all three honeycomb sections 210, 220 and 230 are used together as shown in FIG. 6, fluid flow velocity equalizer means comprises the three honeycomb sections.

FIG. 7 is a schematic diagram of an alternate embodiment of the invention. Fluid containing a contaminant flows through conduit 40. Fluid flow velocity equalizer means 210 produces substantially equal fluid flow velocities over the cross-sectional area of said conduit. Fluid flow measuring station 10 is positioned a contaminant flows through conduit 40. Fluid flow velocity equalizer means 210 produces substantially equal fluid flow velocities over the cross-sectional area of said conduit. Fluid flow measuring station 10 is positioned in conduit 40 immediately downstream of equalizer means 210 and provides the fluid flow velocities to a transmitter 240. Isokinetic sampling means 30 is positioned in conduit 40 near the sensing plane of station 10.

Outlet line 60 carries the isokinetic sample away from conduit 40. The sample flows through outlet line 60 through a valve 280 for regulating the sample flow velocity at inlets 31, 32 and 33 (FIG. 2) and pump means 285 in outlet line 60 downstream of valve 280 for pumping the sample out of conduit 40 FIG. 7, through outlet line 60. In the embodiment shown in FIG.7, a constant fluid flow velocity is maintained through conduit 40 by a conduit flow control means comprising regulator 290 and damper control 295, which responds to the fluid flow velocity sensed by station 10 and in response thereto changes the orientation of damper blades 296 in conduit 40 upstream of equalizer means 210. Regulator 290 receives the fluid flow velocity from transmitter 240 and adjusts damper 295 to maintain a constant flow velocity through conduit 40. In this embodiment, since a constant flow velocity is maintained in conduit 40, it is not necessary to use sample sensing means which are present in other embodiments of this invention. In the embodiment shown in FIG. 7, valve 280 is adjusted to create isokinetic flow conditions for the particular fluid flow rate to be maintained through conduit 40. Valve 280 is adjusted for a given flow rate of fluid through conduit 40 by adjusting valve 280 until the sample flow velocity at inlets 31, 32 and 33 (FIG. 2) displayed at meter 283 in outlet line 60 is equal to the flow velocity displayed at meter 282 which receives the output of transmitter 240.

The embodiment shown in FIG. 7 may also contain a fiter 260 in outlet line 60 for collecting the contaminant from the sample. In order to relate the volume of contaminant collected by filter 260 to the volume of fluid passing through conduit 40, integrating means 300 may be utilized. Integrating means 300 includes a fluid flow volume totalizer 301, a strip chart recorder 302, and an integrator 303, all responsive to the output of transmitter 240.

The embodiment of the invention shown in FIG. 7 may include further optional equipment. Such optional equipment includes a sample velocity sensing means 320 (constructed in similar fashion to sensing means 90) connected to outlet line 60 and control means 350 responsive to the fluid flow velocity sensed by measuring station 10 and sample flow velocity sensed by sample sensing means 320 for regulating sample flow velocity relative to said fluid flow velocity. Control means 350 includes a comparator 351 (similar to comparator 110) which compares sample velocity at sample inlets 31, 32 and 33 (FIG. 2) with fluid flow velociy, and which operates valve 280 to control the sample velocity at sample inlets 31, 32 and 33 (FIG. 2) and to equalize it with the fluid flow velocity.

We claim:

1. An isokinetic sampling system for measuring the amount of contaminant carried per unit volume of fluid flowing through a fluid conduit including:
    fluid flow velocity equalizer means arranged in said conduit for producing substantially equal fluid flow velocities over the cross-sectional area of said conduit,
    a fluid flow measuring station having a plurality of sensors aligned in a sensing plane, said station being positioned in said conduit immediately adjacent to and downstream of said fluid flow velocity equalizer means for sensing fluid flow velocity and flow rate through said conduit,
    isokinetic sampling means positioned in said duct near said sensing plane and having a plurality of inlets distributed over the cross-sectional area of said conduit for receiving a sample of fluid and contaminant flowing through said conduit,
    sample sensing means for sensing the velocity of said sample flowing into said isokinetic sampling means, and
    control means responsive to the fluid flow velocity sensed by said measuring station and to the sample flow velocity for regulating the sample flow velocity relative to said fluid flow velocity.

2. The system of claim 1 wherein said fluid flow velocity equalizer means comprises a first honeycomb section which completely fills the cross-section of said conduit and has a plurality of parallel, axially extending passages, the lengths of said passages varying over the cross-sectional area of said conduit to equalize the fluid flow velocities across the cross-sectional area of said conduit.

3. The system of claim 2 wherein said fluid flow velocity equalizer means further comprises:
    a second honeycomb section in said conduit upstream of said first honeycomb section having axially extending passageways of larger cross-sectional area than said passageways in said first honeycomb section for suppressing the fluid flow velocities near the center of said conduit relative to the fluid flow velocities near the walls of said conduit.

4. The system of claim 3 wherein said fluid flow velocity equalizer means further comprises a third honeycomb section in said conduit upstream of said second honeycomb section having axially extending passageways of larger cross-sectional area than said passageways in said second honeycomb section for converting turbulent flow in said conduit to laminar flow.

5. The system of claim 1 wherein said plurality of inlets lie in said sensing plane.

6. The system of claim 5 further comprising manifold means for communicating said inlets together at a point near the center of said conduit, the cross-sectional area of said manifold means increasing from the walls of said conduit to the center thereof to facilitate isokinetic flow of said sample through said manifold means.

7. The system of claim 1 wherein said sample sensing means comprises a cylindrical chamber of known cross-sectional area, a fourth honeycomb section in said chamber for creating laminar flow of said sample, and a sensing tip in said chamber downstream of said fourth honeycomb section for measuring the static and total pressures of said sample.

8. The system of claim 1 further comprising manifold means for communicating said inlets together, outlet means connected to said manifold means for carrying said sample from said conduit, and filter means in said outlet means for collecting said contaminant from said sample.

9. The system of claim 8 wherein said sample sensing means is downstream of said filter means and said control means comprises a valve for varying the flow of said sample through said sample sensing means to equalize flow velocities of said fluid and said sample, and a vacuum pump downstream of said sample sensing means for pumping said sample out of said conduit.

10. The system of claim 1 further comprising an outlet line through which said sample flows, an analyzer in said outlet line for identifying said contaminant and measuring the quantity of said contaminant, said sample sensing means positioned in said outlet line downstream of said analyzer, and wherein said control means comprises a comparator for comparing the flow velocities of said fluid and said sample, a control valve in said outlet line downstream of said sample sensing means for restricting or increasing the flow of said sample through said outlet line in response to the output of said comparator, and a vacuum pump in said outlet line downstream of said sample sensing means for pumping said sample through said outlet line.

11. The system of claim 10 further comprising a second sample sensing means in said outlet line immediately downstream of said analyzer for measuring the volume of said sample passing through said analyzer,
    an outlet bypass line connected to said outlet line and bypassing said analyzer and said second sample sensing means, and
    bypass control means for regulating the flow of said sample through said bypass line to maintain a constant flow rate of sample through said analyzer.

12. The system of claim 11 wherein said bypass control means comprises
    a bypass control valve in said outlet line immediately downstream of said second sample sensing means receiving the sample flowing through said bypass line and
    a bypass regulator which monitors said second sample sensing means and operates said bypass control valve to maintain a constant sample flow rate through said analyzer.

13. An isokinetic sampling system for measuring the amount of contaminant carried per unit volume of fluid flowing through a fluid conduit including
    fluid flow velocity equalizer means arranged in said conduit for producing substantially equal fluid flow velocities over the cross-sectional area of said conduit,
    a fluid flow measuring station having a plurality of sensors aligned in a sensing plane, said station being positioned in said conduit immediately adjacent to and downstream of said fluid flow velocity equalizer means for sensing fluid flow velocity and flow rate through said conduit,
    conduit flow control means responsive to the flow velocity sensed by said station for maintaining a constant flow rate of said fluid through said conduit,
    isokinetic sampling means positioned in said conduit near said sensing plane and having a plurality of inlets distributed over the cross-sectional area of said conduit for receiving a sample of fluid and contaminant flowing through said conduit, an outlet line carrying said sample away from said conduit, a valve in said outlet line for setting the sample flow velocity at the same magnitude as the velocity of said fluid flowing through said conduit, and pump means in said outlet line for pumping said sample out of said conduit and through said outlet line.

14. The system of claim 13 further comprising:

a filter in said outlet line for collecting said contaminant, and integrating means responsive to said station for measuring the total volume of fluid flowing through said conduit during the operation of the sampling system.

15. The system of claim 14 further comprising a sample sensing means in said outlet line for measuring sample flow velocity, and control means responsive to the fluid flow velocity sensed by said measuring station and to the sample flow velocity for regulating sample flow velocity relative to said fluid flow velocity.

* * * * *